United States Patent [19]

Abramowsky et al.

[11] Patent Number: 5,038,488
[45] Date of Patent: Aug. 13, 1991

[54] PROTECTIVE ARRANGEMENT FOR A LONGITUDINALLY EXTENDIBLE MACHINE COMPONENT

[75] Inventors: Heinz Abramowsky, Giengen; Helmut Müller, Schwäbisch-Gmünd; Roland Roth, Waldstetten, all of Fed. Rep. of Germany

[73] Assignee: Carl-Zeiss-Stiftung, Heidenheim, Fed. Rep. of Germany

[21] Appl. No.: 416,724

[22] Filed: Oct. 3, 1989

[30] Foreign Application Priority Data

Oct. 4, 1988 [DE] Fed. Rep. of Germany ....... 3833680

[51] Int. Cl.⁵ .............................................. G01B 5/20
[52] U.S. Cl. ....................................... 33/503; 33/501; 409/134; 901/49
[58] Field of Search ................. 33/501, 503, 556, 558; 901/49, 20; 250/338.1; 409/134; 408/5, 710

[56] References Cited

U.S. PATENT DOCUMENTS

| | | | |
|---|---|---|---|
| 4,175,327 | 11/1979 | Herzog | 33/503 |
| 4,332,989 | 6/1982 | Nicolaisan | 901/49 |
| 4,575,947 | 3/1986 | Stauber | 33/558 |
| 4,713,892 | 12/1987 | Strauss . | |
| 4,915,574 | 4/1990 | Park et al. | 901/49 |

FOREIGN PATENT DOCUMENTS

| | | |
|---|---|---|
| 0116807 | 8/1984 | European Pat. Off. . |
| 3514444 | 10/1986 | Fed. Rep. of Germany . |
| 1248526 | 11/1960 | France ................. 901/49 |
| 0136260 | 11/1978 | Japan ................... 901/49 |
| 1235446 | 10/1986 | Japan ................... 901/49 |
| 0049205 | 3/1987 | Japan ................... 33/503 |
| 0222883 | 9/1989 | Japan ................... 901/49 |
| 1029807 | 5/1966 | United Kingdom . |
| 1342144 | 12/1973 | United Kingdom . |
| 1436953 | 5/1976 | United Kingdom . |
| 1482567 | 10/1977 | United Kingdom . |

*Primary Examiner*—Thomas B. Will
*Attorney, Agent, or Firm*—Walter Ottesen

[57] ABSTRACT

The invention is directed to a protective arrangement for a longitudinally extendible machine component such as the measuring arm of a machine such as a coordinate measuring apparatus. The protective arrangement includes a bellows which at least partially surrounds the machine component and has a plurality of structural parts at least one of which is deflectable relative to the longitudinal axis of the machine component in response to a contact of the bellows with an object or person. Each of the structural parts has a cutout formed therein and the parts are disposed in the bellows so as to cause the cutouts to be mutually aligned in the undeflected condition of the bellows. A light barrier directs a light beam through the cutouts which becomes at least partially shaded in response to a deflection of the one structural part. The light barrier generates a signal in response to the shading and this signal is supplied to a protective circuit in the control unit of the machine which can, for example, initiate an emergency stoppage of the machine component thereby preventing damage.

7 Claims, 4 Drawing Sheets

PROTECTIVE ARRANGEMENT FOR A LONGITUDINALLY EXTENDIBLE MACHINE COMPONENT

FIELD OF THE INVENTION

The invention relates to a protective arrangement for a longitudinally extendible machine component The protective arrangement includes one or more light barriers extending along the length of the machine component.

BACKGROUND OF THE INVENTION

In machine technology and especially in the construction of coordinate measuring apparatus, it is often necessary to protect longitudinally extending, movable components which project into the work or measuring area against unintended collisions. Such machine components can be, for example, the measuring arm of a coordinate measuring apparatus with the measuring arm carrying the measuring tool in the form of a measuring head. Injury to operating personnel by the movable machine components is also to be prevented.

For this purpose, various protective devices are already known. For example, U.S. Pat. No. 4,713,892 discloses a protective device wherein an ultrasonic envelope is placed about the machine component to be protected or provides for a plurality of helical springs arranged along the length of the component which are at another electrical potential compared to the structure of the machine and bring the drive of the machine to standstill when there is a contact with the machine component.

Protective devices in the form of several light barriers which extend along the length of the machine component are disclosed in European patent publication 0,116,807 and German published patent application 3,514,444. A protective envelope is provided and formed by a plurality of light barriers arranged one next to the other. When this protective envelope is penetrated, the electronic circuit to which the light barriers are connected supplies a signal to the emergency-stop control of the particular machine.

These known protective arrangements do operate very reliably; however, a plurality of light barriers arranged close one next to the other is required to provide the reliability of operation which is adequate. This configuration is needed since no gaps can occur in the protective envelope defined by the light barriers through which, for example, projections on the object to be measured can come into contact with the measuring arm and damage the latter.

The protective arrangements described which are configured on the basis of light barriers are therefore relatively complex. Furthermore, the outlying components of the light barriers can easily become dirtied. These outlying components can, for example, include the surfaces of the light sources and the receivers as well as prisms used as may be required for beam deflection. This leads to the condition that the protective device responds even though no collision incident is present.

SUMMARY OF THE INVENTION

It is an object of the invention to provide a protective arrangement for longitudinally extending machine components such as the measuring arms of coordinate measuring apparatus. It is another object of the invention to provide such a protective arrangement which affords the greatest possible reliability against a disturbance and yet have the least complexity.

The protective arrangement of the invention is for a machine component defining a longitudinal axis and being extendible along this axis. The protective arrangement includes: a bellows extending in the direction of the axis and at least partially covering the machine component; the bellows being mounted on the component and having a plurality of structural parts at least one of which is deflectable relative to the axis in response to a contact of the bellows with an object or person; each of the parts having a cutout formed therein and the parts being disposed in the bellows so as to cause the cutouts to be mutually aligned in the undeflected condition of the bellows; and, light barrier means for directing a light beam through the cutouts which becomes at least partially shaded in response to a deflection of the one structural part.

According to a feature of the invention, the beam of the light barrier passes through cutouts in the structural parts of the bellows which can be partitioning legs of the bellows.

With this feature, a complete protection of the particular machine component against collision is provided from all sides with very few light barriers. Indeed, a machine component which is equipped with a bellows enclosing the component from all sides is reliably protected against collision from all directions with only a single light barrier; that is, the component is protected against collision over an angular range of 360°. According to the invention, the beam of the light barrier is guided through cutouts in the partitioning legs of the bellows and these partitioning legs are always displaced as a unit in the presence of a collision at other sides of the bellows. For this reason, the beam of the light barrier is in every instance at least partially shaded if not entirely interrupted. This condition can be reliably detected by a suitable electronic circuit and processed to generate a corresponding switching signal.

Machine components often are provided with guides in any event which are covered against dirt accumulation and other contamination by means of the bellows. It is then only necessary to punch cutouts into the partitioning legs of the bellows in order to accommodate the protective arrangement according to the invention and to mount the few light barriers on the machine component. The light barriers can be few indeed, for example, one or two light barriers can for example be adequate. In this way, the bellows then additionally protects the components of the light barrier from contamination.

As a rule, the response sensitivity of light barriers depends upon the travel distance, that is, the spacing between the light source and the detector. For machine components which not only travel transversely to the longitudinal direction but also are moved in the longitudinal direction, the travel distance of the light barrier used to protect this component is not constant. The response sensitivity of the light barrier is therefore dependent upon the length to which the machine component can be extended.

A response sensitivity which is independent of the extension length can be realized, however, if for each light barrier at least two detectors are provided having respective signals which are compared to each other via an electronic circuit. This comparison can be, for example, by setting the signals in proportion to each other.

For this purpose, comparators are preferably provided with each comparator having a first input and a second (reference) input. The signal of one detector is supplied to the first input of the first comparator and to the second input of the second comparator and the signal of the other detector lying axially opposite the one detector is applied to the first input of the second comparator and to the second input of the first comparator. These comparators become conductive only when the quantities of light falling on the detectors change unevenly. An increase or a decrease of the beam intensity because of increasing or decreasing travel distance between the light source and the detectors does not cause the comparators to respond since this influence operates in the same manner on both receivers and no dissymmetry occurs.

Detectors suitable for this purpose are so-called four-quadrant diodes having quadrants lying crosswise opposite each other which are compared to each other.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
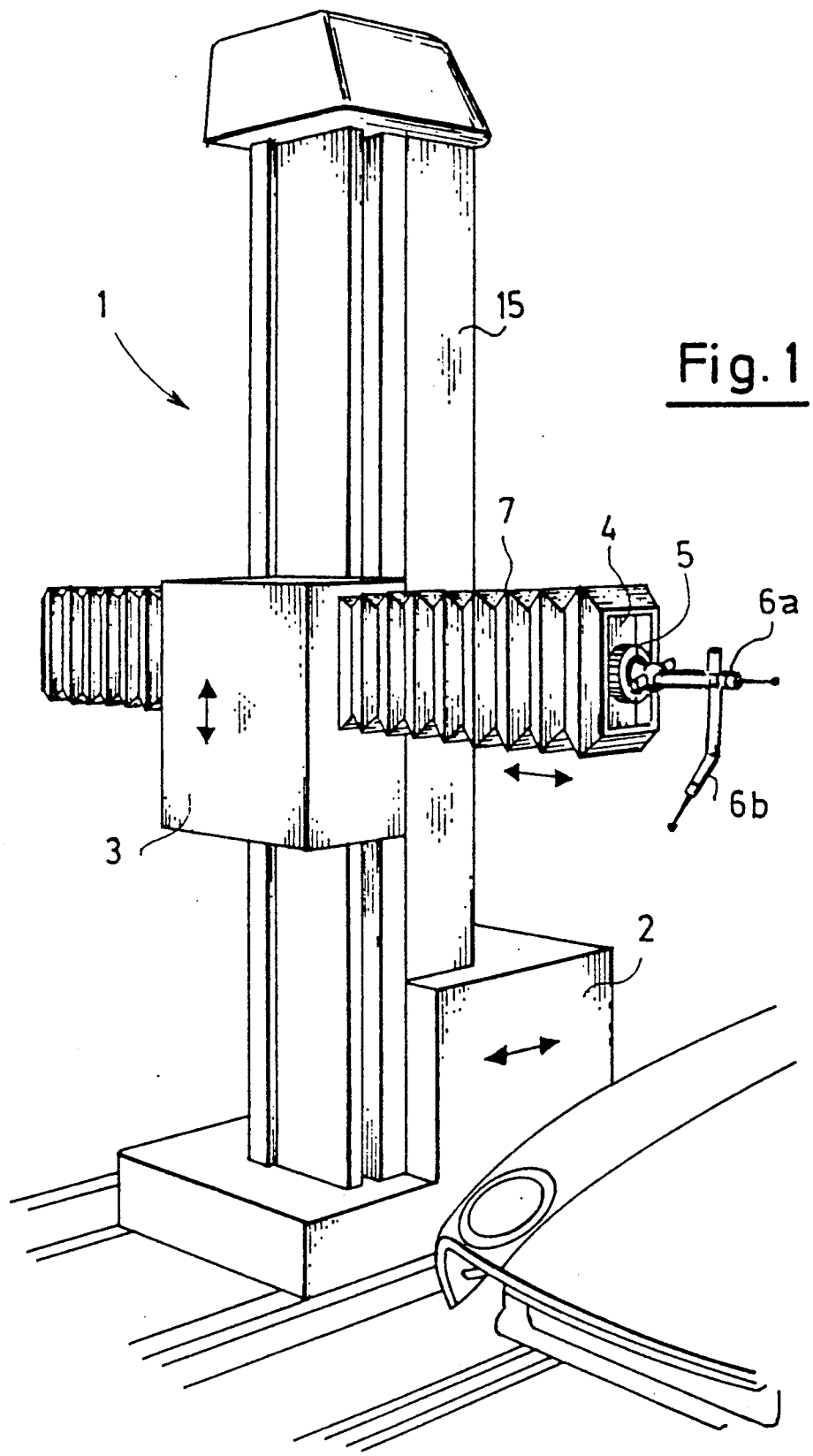
FIG. 1 is a perspective view of a coordinate measuring apparatus configured in the form of a stand and equipped with a protective arrangement according to the invention.

FIG. 1 shows a coordinate measuring apparatus 1 having a stand-like configuration. The base 2 of this apparatus is movable in the horizontal direction along guides embedded in the foundation. A slide 3 is displaceably journalled on the stand 15 of the apparatus 1 for displacement in elevation. The slide 3, in turn, accommodates the transverse arm 4 displaceable with respect to the slide 3 in the horizontal direction and along its longitudinal axis. The transverse arm 4 is the actual measuring arm of the coordinate measuring apparatus and carries a holder 5 on its end face for different probes (6a and 6b) with which the object to be measured is measured by contacting the latter with the probes.

The guides (not shown) of the transverse arm 4 are covered by the bellows 7 in the region thereof in which the transverse arm projects outwardly from the slide 3. Accordingly, the parts of the bellows 7 covering the forwardly and rearwardly projecting ends of the transverse arm 4 expand and collapse with each movement of the transverse arm 4 in its longitudinal direction.

The machine also moves the transverse arm 4 with high speed laterally in accordance with the measuring program, that is, perpendicularly to its longitudinal direction as well as in elevation. For this reason, unintended collisions can occur with objects placed in the measuring area and with the object to be measured itself when the programming is incorrect. Collisions can also occur with unattentive operating personnel.

Figure 2:
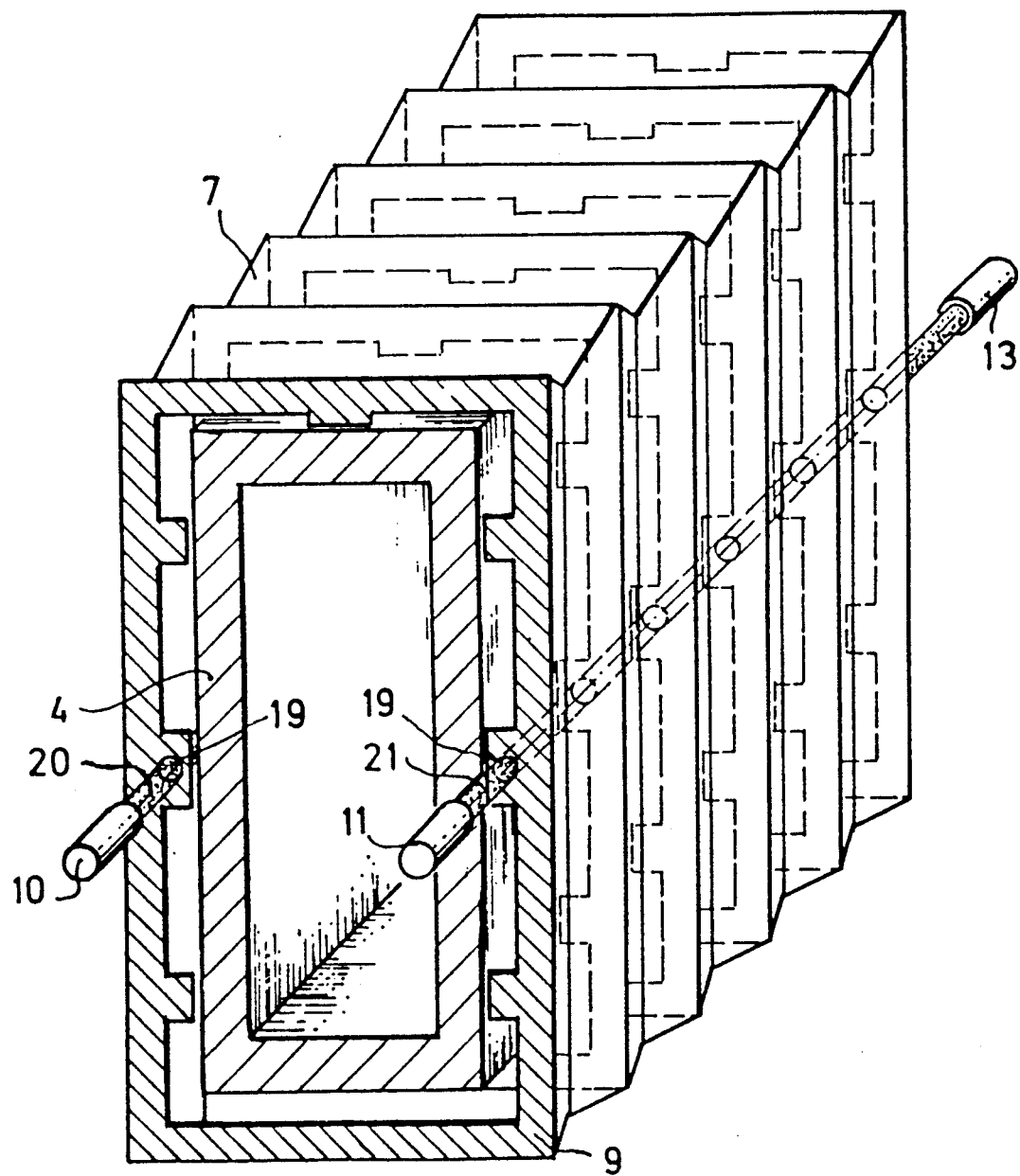
FIG. 2 is a segment of the measuring arm of the apparatus of FIG. 1 shown in an enlarged scale.

In order to prevent such collisions, the partitioning legs 9 of the bellows 7 have a plurality of aligned punch holes 19 arranged one behind the other. In the embodiment described, two rows of punched holes are provided on the two opposite lying longer sides of the transverse arm 4. Two beam sources (10 and 11) are mounted on the slide 3 which generate respective light beams directed toward detectors on the rearward and forward ends of the transverse arm. The two light beams (20 and 21) are directed parallel to the longitudinal axis of the machine component and pass through the punched holes 19 in the partition legs 9. In FIG. 2, only the detector 13 for the light barrier on one side of the transverse arm 4 is shown.

When a collision with a workpiece or an operating person occurs in the region of the bellows 7, at least one of the partition legs of the bellows will become displaced or angularly deflected so that the boundary of at least one punched hole 19 will at least partially dip into the beam cross section of the light barrier. This occurs also for a collision at the upper or lower narrow sides of the transverse arm since the bellows or its partition legs are displaced in elevation.

An electronic circuit arranged downstream of the detector responds and this circuit processes the signal of the detectors in the control unit of the apparatus. The electronic circuit brings the drive of the machine to standstill when the condition of a collision is detected.

Figures 3A, 3B:
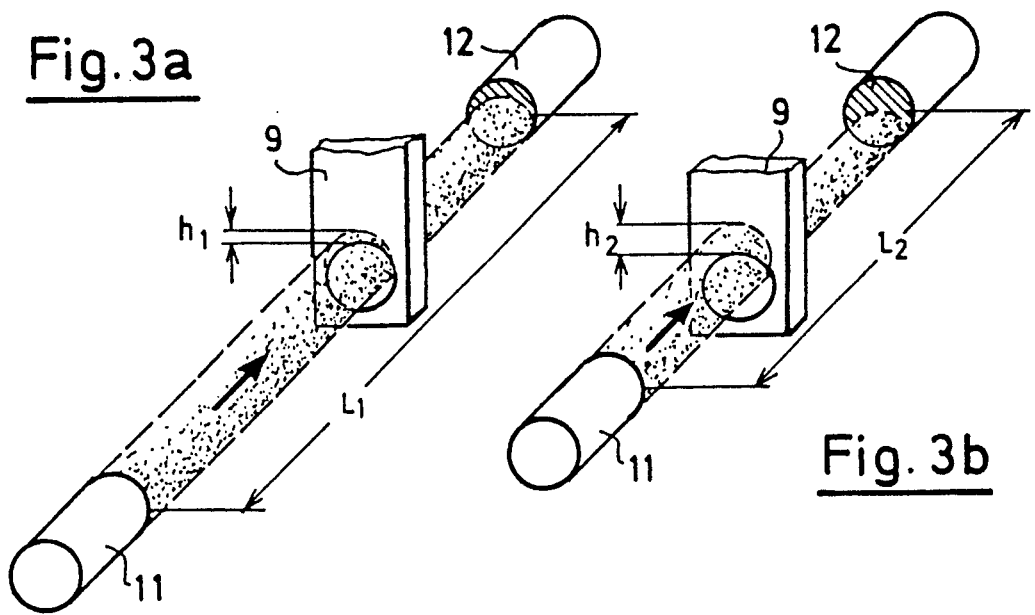
FIGS. 3a and 3b are schematics which show the response sensitivity of a conventional light barrier for two different extended lengths $L_1$ and $L_2$.

As discussed above, the response sensitivity of a light barrier which operates with only one receiver is dependent upon the distance L between the light source and the receiver. This is made clear in the schematics of FIGS. 3a and 3b. If one proceeds on the premise that the light barrier responds below a specific threshold value to a quantity of light falling upon the receiver 12, then this threshold value will be reached sooner the greater the distance is between the light source 11 and the detector 12. The intensity of the radiation falling on the detector 12 increases with decreasing the distance between light source 11 and detector 12. For this reason, in case of a shorter distance $L_2$, the dip path $h_2$ of the diaphragm 9 shading the beam cross section must become greater in order to darken the detector to below the threshold value than in case of a longer distance $L_1$ between light source 11 and detector 12, where the dip path $L_1$ is smaller.

Figure 5:
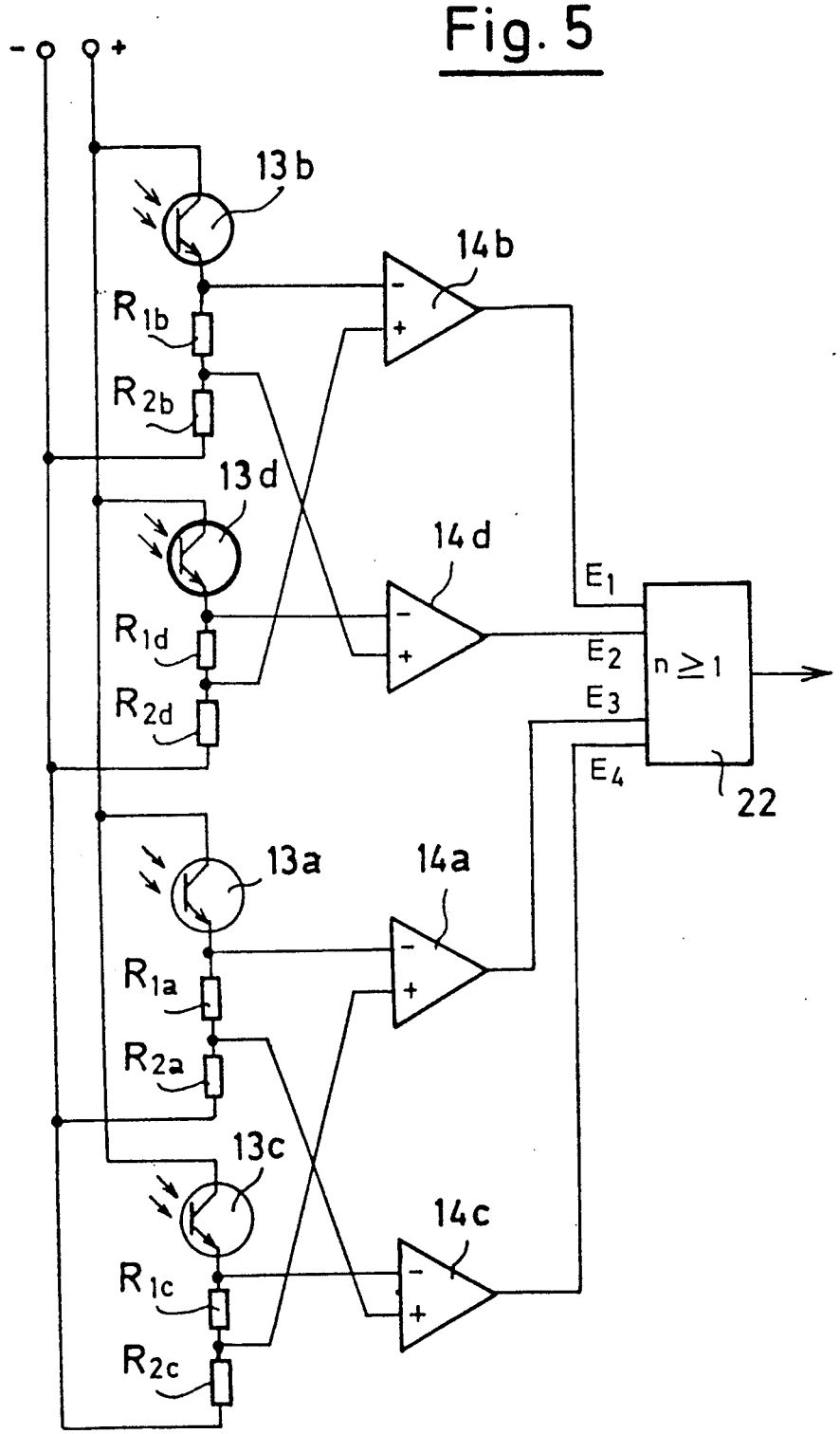

The response sensitivity in the event of a collision for the light barrier shown in FIG. 2 is intended to be independent of the extended length of the transverse arm 4. For this reason and as shown in FIG. 5, two four-quadrant diodes 13 are used as the respective detectors for the two light barriers. The four quadrants (13a, 13b, 13c and 13d) of these diodes are connected with each other so that it is not the contiguous quadrants which are connected with each other, but rather, the quadrants (13a, 13c) and (13b, 13d) which lie diagonally opposite each other. Thus, the signals of the mutually opposite quadrants are compared to each other.

The two quadrants (13b and 13d) of a segment pair are connected to a voltage source via respective resistor sets (R1b/R2b and R1d/R2d). A current flows through each resistor set which is proportional to the intensity of the light incident upon the corresponding quadrant (13b or 13d). Correspondingly, voltages drop across resistor sets (R1b/R2b and R1d/R2d) which are proportional to the light intensities on respective ones of the quadrants.

Each of the comparators (14b and 14d) have a first input designated by (+) in FIG. 5 and a second input designated by (−). The first input of comparator 14b is connected crosswise to the tap of the voltage divider (R1d/R2d) of the quadrant (13d) and the first input of comparator 14d is connected crosswise to the tap of the voltage divider (R1b/R2b) of quadrant 13b.

With the circuit shown in FIG. 5, the condition is obtained that neither comparator (14b or 14d) can become conductive when the light intensity incident on both quadrants (13b and 13d) uniformly decreases or increases because of a respective increase or decrease of the distance L. However, at least one of the two comparators 14b and 14d becomes conductive when the light intensities incident upon the quadrants (13b and 13d) differ from each other beyond a proportion defined by the respective voltage dividers (R1b/R2b and R1d/R2d).

Figures 4A, 4B:
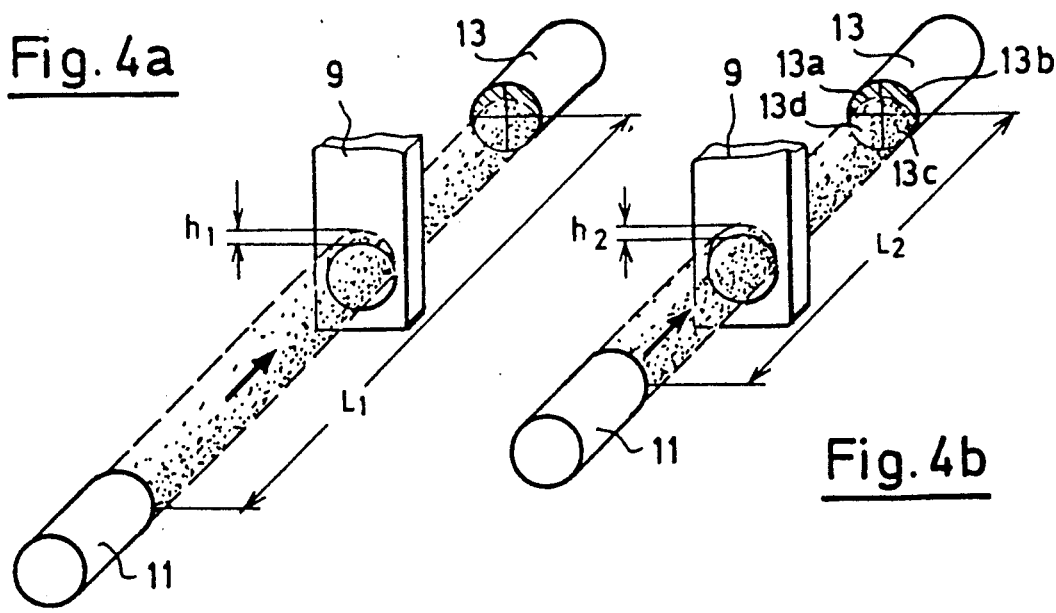
FIGS. 4a and 4b are schematics drawn in the manner of those shown in FIGS. 3a and 3b and show the light barriers of the protective arrangement according to the invention; and, FIG. 5 is a diagram of the electronic circuit for processing the signals of the detectors of the light barriers shown in FIGS. 2 and 4.

The dip depth $h_1$ or $h_2$ shown in FIGS. 4a and 4b is independent of the different pullout length (travel distance) L1 or L2 of the light barrier because the light intensities incident upon the quadrants 13a and 13c of the detector 13 are compared with each other by an identical circuit.

A digital component (OR-gate 22) connected downstream of the comparators (14a to 14d) announces the conductivity of one of the comparators and thereby the presence of a collision incident to the machine control unit (not shown) of the coordinate measuring apparatus 1.

In the above embodiment, the protective arrangement was shown with respect to the horizontal extension arm of a coordinate measuring apparatus mounted in a stand-like configuration. The protective arrangement of the invention is applicable in the same manner to other machine types such as the vertical quill of a coordinate measuring apparatus having a portal or bridge-like configuration.

It is understood that the foregoing description is that of the preferred embodiments of the invention and that various changes and modifications may be made thereto without departing from the spirit and scope of the invention as defined in the appended claims.

What is claimed is:

1. A protective arrangement for a machine component defining a longitudinal axis and being extendible and retractable along said axis, the protective arrangement comprising:
   a bellows extending in the direction of said axis and at least partially covering the machine component;
   said bellows being mounted on said component so as to be extendible and retractable with said component and having a plurality of structural parts at least one of which is deflectable relative to said axis in response to a contact of said bellows with an object or person;
   each of said parts having a cutout formed therein and said parts being disposed in said bellows so as to cause the cutouts to be mutually aligned in the undeflected condition of said bellows;
   light barrier means for directing a light beam through said cutouts which becomes at least partially shaded in response to a deflection of the one structural part to produce a shaded light beam defining a signal; and,
   circuit means receiving said shaded light beam signal for generating an output signal for acting on said machine component to bring said machine component to standstill.

2. The protective arrangement of claim 1, said bellows having a plurality of folds and being configured so as to completely surround said component in spaced relationship thereto; and, said structural parts being partitioning members separating respective ones of said folds one from the other.

3. The protective arrangement of claim 2, each of said partitioning members being a frame-like member having first and second legs on opposite sides of said axis; and, said cutouts being a first set of cutouts and being formed in respective first legs of said frame-like members and said light barrier means being a first light barrier for directing said light beam through said first set of cutouts with said light beam being a first light beam; and, said second legs of said frame-like members having respective mutually aligned cutouts formed therein to define a second set of cutouts; and, a second light barrier for directing a second beam through said second set of cutouts.

4. A protective arrangement for an elongated machine component defining a longitudinal axis and being extendible and retractable along said axis so as to be at a first position corresponding to a first distance away from a reference position and to then be at a second position corresponding to a second distance away from the reference position, the protective arrangement comprising:
   a bellows extending in the direction of said axis and at least partially covering the machine component;
   said bellows being mounted on said component so as to be extendible and retractable with said component and having a plurality of structural parts deflectable relative to said axis in response to a contact engagement of said bellows with an object or person;
   each of said parts having a cutout formed therein and said parts being disposed in said bellows so as to cause said cutouts to be mutually aligned in the undeflected condition of said bellows;
   a light barrier unit having a response sensitivity and including: a light source for directing a light beam through said cutouts which becomes at least partially shaded in response to a deflection of at least one of said structural parts; and, first and second detectors for receiving the light beam and for supplying first and second signals;
   said light source and said detectors being mounted on said machine component so that the length of the light beam between said source and said detectors changes in correspondence to said distances as said machine component is extended and retracted; and,
   comparator circuit means for comparing said signals to each other in such a manner that said response sensitivity of said light barrier unit is independent of the lengths of said light beam corresponding to said first and second distances and for supplying an output in response to a predetermined difference between said signals for acting on said machine component to bring said machine component to standstill.

5. The protective arrangement of claim 4, said light beam defining a beam axis and said first and second detectors being mounted on opposite sides of said beam axis; and, said comparator circuit means including first and second comparators; each of said comparators having signal input and a reference input; said first detector being connected to the signal input of said first comparator and to the reference input of said second comparator; and, said second detector being connected to the signal input of said second comparator and to the reference input of said first comparator.

6. The protective arrangement of claim 5, said light barrier unit including a four-quadrant diode and said first detector being a first pair of quadrants of said diode and said second detector being a second pair of quadrants of said diode.

7. The protective arrangement of claim 4, wherein said machine component is the measuring arm of a coordinate measuring apparatus.

* * * * *

UNITED STATES PATENT AND TRADEMARK OFFICE
CERTIFICATE OF CORRECTION

PATENT NO. : 5,038,488
DATED : August 13, 1991
INVENTOR(S) : Heinz Abramowsky, Helmut Müller and Roland Roth It is certified that error appears in the above-identified patent and that said Letters Patent is hereby corrected as shown below:

In column 1, line 8, after "component" add -- . --.

In column 4, line 50: delete "$L_1$" and substitute -- $h_1$ -- therefor.

In column 7, line 2, between "having" and "signal" insert -- a --.

Signed and Sealed this

Sixth Day of April, 1993

Attest:

STEPHEN G. KUNIN

Attesting Officer

Acting Commissioner of Patents and Trademarks